(12) United States Patent
Keam

(10) Patent No.: US 7,913,921 B2
(45) Date of Patent: Mar. 29, 2011

(54) OPTICALLY TRACKABLE TAG

(75) Inventor: Nigel Keam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 809 days.

(21) Appl. No.: 11/787,308

(22) Filed: Apr. 16, 2007

(65) Prior Publication Data

US 2008/0251584 A1 Oct. 16, 2008

(51) Int. Cl.
*G06K 19/06* (2006.01)
(52) U.S. Cl. .......................................... 235/494; 235/487
(58) Field of Classification Search .................. 235/487, 235/490, 494
See application file for complete search history.

(56) References Cited

U.S. PATENT DOCUMENTS

| | | | | |
|---|---|---|---|---|
| 4,201,339 | A | * | 5/1980 | Gunn ............................. 235/487 |
| 5,053,612 | A | | 10/1991 | Pielemeier et al. |
| 6,017,125 | A | | 1/2000 | Vann |
| 6,616,039 | B1 | * | 9/2003 | Saporetti et al. .............. 235/455 |
| 6,732,926 | B2 | | 5/2004 | Shoemaker, Jr. |
| 7,412,089 | B2 | * | 8/2008 | Squires et al. ................. 382/141 |
| 2006/0000911 | A1 | | 1/2006 | Stekel |
| 2006/0091219 | A1 | | 5/2006 | Joseph et al. |
| 2006/0196950 | A1 | * | 9/2006 | Kiliccote ....................... 235/494 |
| 2006/0249581 | A1 | | 11/2006 | Smith |
| 2006/0278712 | A1 | | 12/2006 | Olmstead |
| 2008/0000991 | A1 | * | 1/2008 | Yin et al. ....................... 235/494 |
| 2008/0101693 | A1 | * | 5/2008 | Young et al. .................. 382/165 |

FOREIGN PATENT DOCUMENTS

| JP | 2003346077 A | * | 12/2003 |
|---|---|---|---|
| WO | WO0017807 A1 | | 3/2000 |
| WO | WO2006120685 A2 | | 11/2006 |

OTHER PUBLICATIONS

"Bar Codes Symbologies", http://www.taltech.com/TALtech_web/resources/intro_to_bc/bcsymbol.htm.
"Quadrus MINI", http://www.quadrus-ez.com/products/quadrusmini.htm.
Bailey, Donald G, "Super-Resolution of Bar Codes", Date: Nov. 1998, http://sprg.massey.ac.nz/pdfs/1998_SPIE_204.pdf.

* cited by examiner

*Primary Examiner* — Thien M. Le
*Assistant Examiner* — Christle I Marshall
(74) *Attorney, Agent, or Firm* — Alleman Hall McCoy Russell & Tuttle LLP

(57) ABSTRACT

The tracking of a motion of an optically readable tag is disclosed. In one embodiment, an optically readable tag comprises a plurality of data features, one or more orientation features, and an optically readable tracking feature. The tracking feature comprises a continuous region with a minimum dimension greater than a maximum dimension of each data feature. Additionally, the data features and the orientation features are separated from the tracking feature by a border having a minimum width greater than a maximum dimension of each data feature. With this configuration, the tracking feature may be tracked even when a tag is moving too quickly for the data features to be read and tracked.

15 Claims, 5 Drawing Sheets

OPTICALLY TRACKABLE TAG

BACKGROUND

Optically readable tags encode data in an optically readable format. Some optically readable tags, such as bar codes, are considered to be one-dimensional in that the tags encode information in a format that can be read via a scan along one direction. Other tags are considered to be two-dimensional in that the tags encode information along two directions. Two dimensional tags may be read by an optical imaging device, such as a charge-coupled device or CMOS imaging device.

An amount of information encoded by a tag may be increased per unit area by increasing a density of the features on the tag that are used to represent bits of data. For example, in a two-dimensional tag that encodes data in the form of small rectangular features, the bit depth of the tag may be increased by increasing a number of the rectangular features per unit area. However, the resulting decrease in size of the data features on a tag may increase the difficulty of reading a tag, as the data features may appear blurred to an imaging device used to read the tag if the tag is in motion during reading.

SUMMARY

Accordingly, an optically trackable tag is described is described below in the Detailed Description. For example, one disclosed embodiment provides an optically readable tag including a data region with a plurality of data features, one or more orientation features, and an optically readable tracking feature. The tracking feature includes a continuous region with a minimum dimension greater than a maximum dimension of each data feature. Additionally, the data region and the orientation features are separated from the tracking feature by a border having a minimum width greater than a maximum dimension of each data feature. With this configuration, the tag may be tracked even when it is moving too quickly for the data feature to be read.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
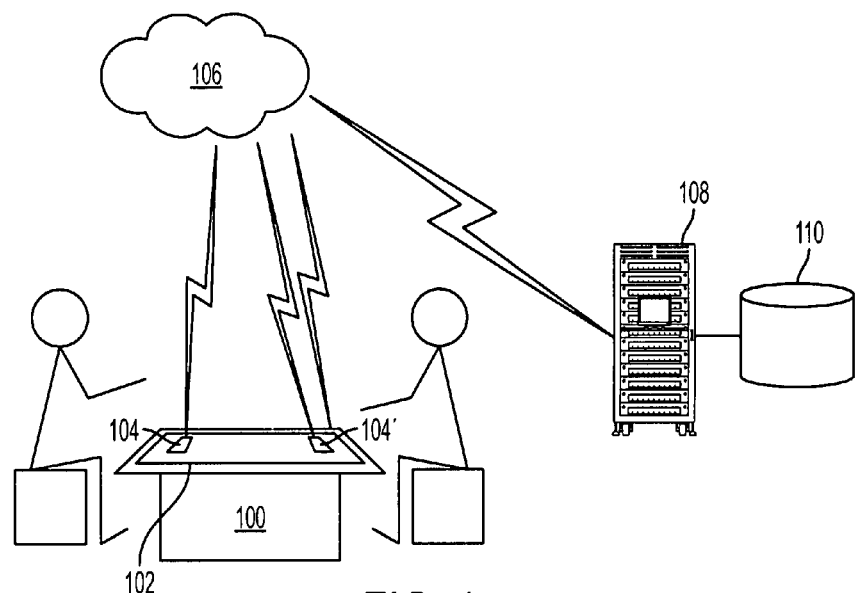
FIG. 1 shows an embodiment of an example use environment for a optically readable tag.

Prior to discussing the embodiments of optically readable tags disclosed herein, an example of a use environment for an optically readable tag is described. FIG. 1 shows an embodiment of a display device 100 configured to optically read tags associated with one or more objects 104, 104' resting on a display surface 102 of the device. Display device 100 may also be configured to identify the objects and/or the owners of the objects by the value of the tag. Display device 100 is further configured to display items of data associated with each object on the display in a location associated with the corresponding object. Further, as the user moves an object across display surface 102, display device 100 is configured to track the motion of the device by optically tracking the tag, and may further be configured to move the displayed items of data across the display surface in a corresponding manner. In this manner, images displayed on display device 100 may be moved to track the motion of objects 104, 104'.

Data that may be associated with an object on display device 100 includes, but is not limited to, photographic data, video data, music and other audio data, graphical data, documents, spreadsheets, presentations, and any other suitable type of data. For example, in some embodiments, display device 100 may be configured to automatically download photographic data from a device placed on its surface (for example, where objects 104, 104' are digital cameras or cell phones) via a wireless network 106, and then to display the downloaded photographs adjacent to the camera or cell phone from which they were downloaded. Movement of the camera or cell phone to another location on display surface 102 would cause the photographs to follow the movement of the camera or cell phone across display surface 102. Likewise, changes in the orientation of the camera or cell phone may be tracked, and may cause the photographs to change orientation in a similar manner.

In other embodiments, display device 100 may be configured to read the tag associated with an object, and then to download data associated with that object from a remote server 108 or a database 110. As a specific example, a card having an optically readable tag may be issued to and linked specifically to a guest at a resort, amusement park, or other such entertainment facility. While the user is at the entertainment facility, photographs may be taken of the guest performing various activities, such as riding rides, participating in sports activities, etc. These photographs may be displayed to the user at a kiosk for selection after the activity has concluded.

Upon conclusion of the ride, a person may view the photographs at a kiosk, use a tag reader at the kiosk to register the identity of the person making the selection, and then select photographs in which the rider and/or the rider's friends and/or family appear. Then, at a later time and/or different location, for example, in a hotel lobby, a restaurant affiliated with the resort, etc., the rider may place the card on the surface of display device 100. The device may determine the identity of the holder of the card by optically reading the tag on the card, may query a database to determine those photos previously selected by the rider, and then download those photographs for display on display screen 102 in a location associated with the card. The photographs may then be moved on display screen 102 by moving or rotating the card.

It will be appreciated that, with sufficient tag bit depth, a sufficiently large number of uniquely-valued tags may be produced such that each camera, cell phone, credit card, driver's license, and/or any other desired object may be uniquely identified by a tag. In this case, referring to the resort example above, a user may use a tagged credit card, license, cell phone, or any other tagged object to alert a kiosk of the user's identity, instead of a resort-issued card. The user then may use the same tagged object, or any other tagged object associated with that user, to later download content.

Figure 2:
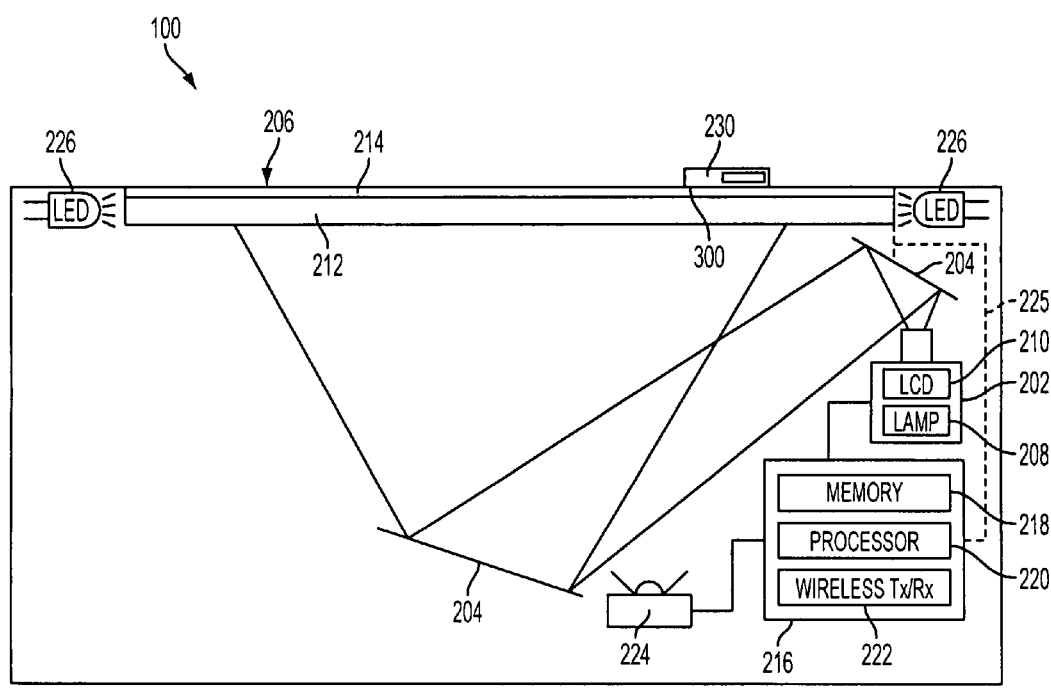
FIG. 2 shows a block diagram of the embodiment of FIG. 1.

FIG. 2 shows a schematic depiction of display device 100. Display device 100 comprises a projection display system having an image source 202, optionally one or more mirrors 204 for increasing an optical path length and image size of the projection display, and a display screen 206 onto which images are projected.

Image source 202 includes an optical or light source 208 such as the depicted lamp, an LED array, or other suitable light source. Image source 202 also includes an image-producing element 210 such as the depicted LCD (liquid crystal display), an LCOS (liquid crystal on silicon) display, a DLP (digital light processing) display, or any other suitable image-producing element. Display screen 206 includes a clear, transparent portion 212, such as sheet of glass, and a diffuser screen layer 214 disposed on top of the clear, transparent portion 212. In some embodiments, an additional transparent layer (not shown) may be disposed over diffuser screen layer 214 to provide a smooth look and feel to the display surface.

Continuing with FIG. 2, display device 100 further includes an electronic controller 216 comprising memory 218 and a microprocessor 220. Further, controller 216 may include a wireless transmitter and receiver 222 configured to communicate with other devices. Controller 216 may include computer-executable instructions or code, such as programs, stored in memory 218 and executed by microprocessor 220, that control the various embodiments of tag tracking methods described in more detail below. Generally, programs include routines, objects, components, data structures, and the like that perform particular tasks or implement particular abstract data types. The term "program" as used herein may connote a single program or multiple programs acting in concert, and may be used to denote applications, services, or any other type or class of program.

To sense objects and optical tags located on display screen 206, display device 100 includes one or more image capture devices 224 configured to capture an image of the entire backside of display screen 206, and to provide the image to electronic controller 216 for the detection of tags and objects appearing in the image. Diffuser screen layer 214 helps to avoid the imaging of objects that are not in contact with or positioned within a few millimeters of display screen 206, and therefore helps to ensure that only objects that are touching display screen 206 are detected by image capture device 224.

Image capture device 224 may include any suitable image sensing mechanism. Examples of suitable image sensing mechanisms include but are not limited to CCD and CMOS image sensors. Further, the image sensing mechanisms may capture images of display screen 206 at a sufficient frequency or frame rate to detect motion of an object across display screen 206.

Image capture device 224 may be configured to detect reflected or emitted energy of any suitable wavelength, including but not limited to infrared and visible wavelengths. To assist in detecting objects and tags placed on display screen 206, image capture device 224 may further include an additional optical source or emitter such as one or more light emitting diodes (LEDs) 226 configured to produce infrared or visible light. Light from LEDs 226 may be reflected by objects placed on display screen 206 and then detected by image capture device 224. The use of infrared LEDs as opposed to visible LEDs may help to avoid washing out the appearance of projected images on display screen 206.

FIG. 2 also depicts a device 230, such as a cell phone or camera, that has been placed on display screen 206. Device 230 includes an optically readable tag 300 which may be read by optical detector 224 and controller 216. The value of tag 300 as determined by controller may then be used to identify the tagged device 230 and/or an owner of the tagged device by querying a database over a network. Then, data associated with that device and/or owner may be displayed on display 306 in a location associated with device 230. Further, as described below, optical detector 224 and controller 216 may be configured to track the motion and orientation of tag 300 across the surface of display screen 206, as described in more detail below.

Figure 3:
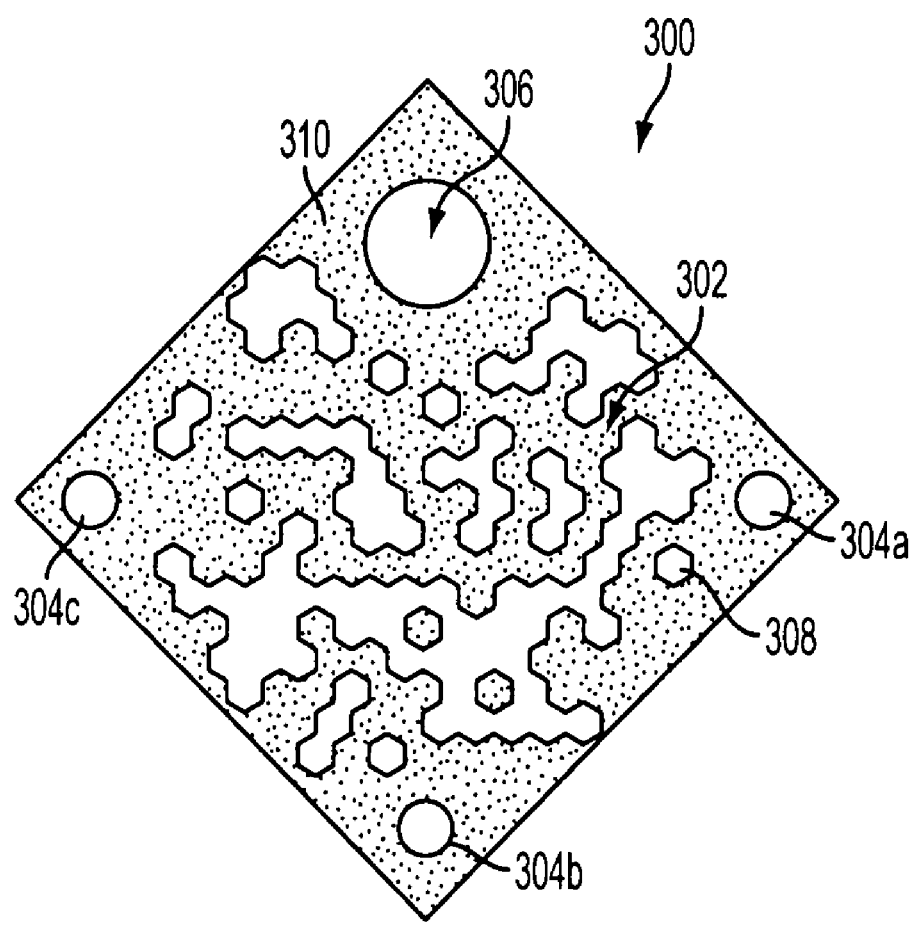
FIG. 3 shows an embodiment of a high-resolution optically readable tag.
Figure 4:
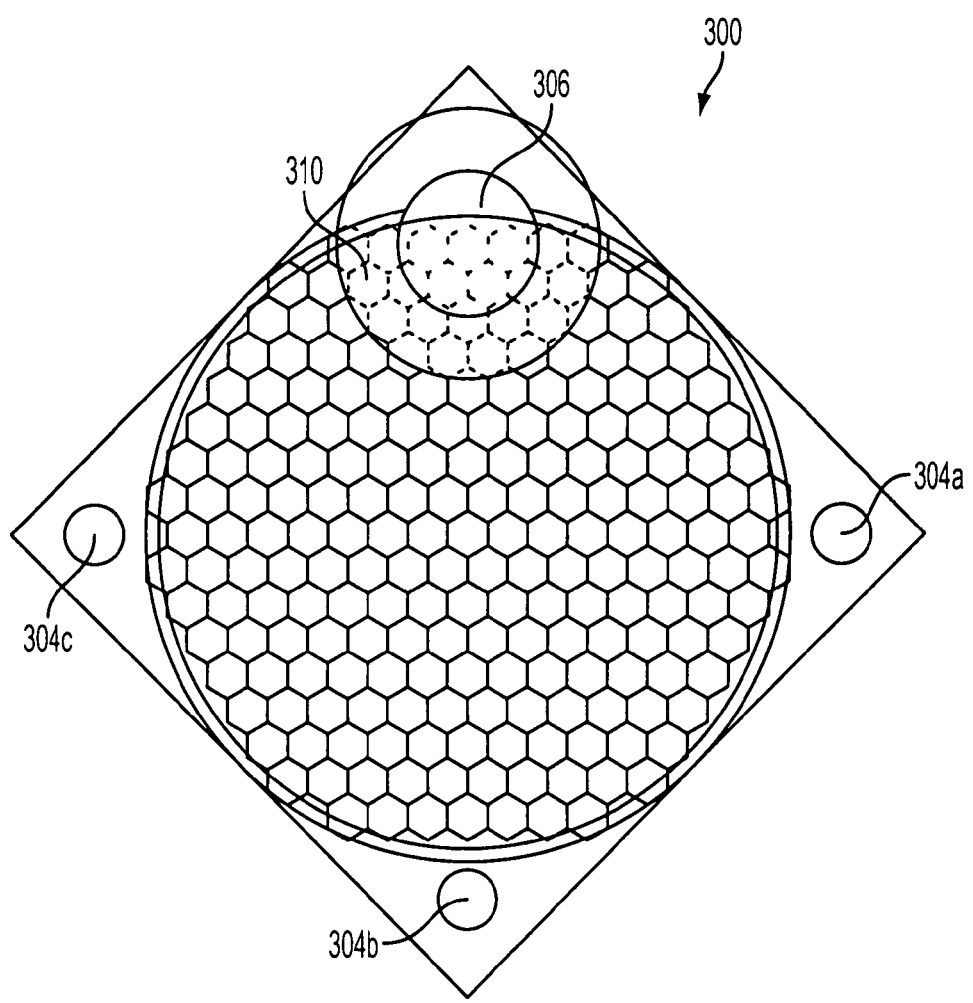
FIG. 4 shows a detailed view of the tag of FIG. 3.

FIG. 3 shows an embodiment of tag 300 in more detail, and FIG. 4 shows a schematic diagram of tag 300. Tag 300 is a two-dimensional tag in that data is encoded in two orthogonal directions on tag 300. Tag 300 comprises a data region 302 having a plurality of high resolution data features, a plurality of orientation features 304a, 304b and 304c, and a lower resolution tracking feature 306. Each data feature 308 in data region 302 takes the form of a small, hexagonal shaped region having one of two optically distinguishable appearances (for example, black or white). Orientation features 304a-c as depicted takes the form of a somewhat larger circular feature located at a corner of tag 300. Orientation features 304a-c allow the orientation of a tag to be determined before the tag is read so that the value of the tag is read accurately. Further, the orientation feature may be read and used by controller 216 to determine an orientation in which to display data associated with tag 300. While the depicted data features 308 have generally hexagonal shapes and orientation features 304a-c have generally circular shapes, it will be appreciated that data features 308 and orientation features 304a-c may have any other suitable shape or shapes, including but not limited to various rounded and/or other polygonal shapes.

In order to maximize bit depth for a given tag size, the density of the data features 308 may be increased by decreasing the size of the data features to a value close to a minimum size that is readable by optical detector 224 while tag 300 is stationary (or moving very slowly). For example, with the depicted tag configuration, bit depths on the order of 148 bits may be achieved with a one-inch square tag via the use of an optical detector 224 of a suitable resolution. This bit depth may allow for a sufficiently large number of different valued tags to exist such that each tagged object may have a globally unique identification. It will be appreciated that the minimum data feature size that is readable may depend upon the optical characteristics of the optical system used to read the tag, including but not limited to the resolution of the image sensor, the modulation transfer function of the lens, blurring effects caused by diffuser layer 214 in display screen 206, etc.

The use of small data features 308, however, increases the difficulty of tracking tag 300 while tag 300 is in motion on display screen 206. For example, small data features 308 may appear blurred in an image captured of tag 300 in motion, and therefore may be difficult or impossible to read accurately. The effect of the blur for a given feature is based at least partially upon the size of the feature being observed relative to the distance the tag moves in the time period during which the image is acquired (i.e. the "integration time" for the sensor). Where the size of the data features 308 are close to the minimum size that can be read due to the constraints of the optical components, little motion of the tag may be tolerated without blur reducing the clarity of the image beyond a point at which the data features 308 cannot be read.

If a tag is moved on display screen 206 to the extent that an image of the tag cannot be matched with certainty to a tag in an immediately prior image by reading the tag, display device 100 may not move images or other data associated with the tag until the tag can again be positively read. This may cause motion of the images to freeze on the screen as display device 100 waits for the motion of tag 300 to slow sufficiently for reading.

Therefore, to facilitate the tracking of tag 300 when in motion, tag 300 includes tracking feature 306. Tracking feature 306 is configured to have a sufficiently low resolution compared to data features 308 such that blurring due to motion has less of an effect on the reading of tracking feature 306, and such that the tracking feature in a most recently acquired image overlaps the same tracking feature in the immediately prior image, or is sufficiently close to the same tracking feature in the immediately prior image, to allow the tracking features in two sequential images to be determined to be the same, even when the tag is moved at a relatively fast speed. It will be appreciated that the nature of this determination may depend upon the particular characteristics of the image capture system used to acquire the images of the tag. For example, where the integration time is the same as the period of frames (i.e. where the camera starts integrating a new frame as soon as the integration of the prior frame is complete), then the image acquisition may be sufficiently fast to detect overlap between images of a tracking feature in sequential images. If, however, there is a gap between integration periods, then the image of a trackable feature between two frames may not overlap, even though the tracking feature is distinguishable in both frames. In this case, a threshold distance for center-to-center maximum distance between tracking features in sequential frames, for example, may be used for determining if they are the same tracking feature.

The depicted tracking feature 306 comprises a continuous region having an optically contrasting appearance compared to a border or border region 310 surrounding tracking feature. The depicted tracking feature 306 has a generally circular shape, but may alternatively have any other suitable shape, including but not limited to other rounded shapes, polygonal shapes, and/or combinations thereof. The use of a round shape may offer the advantage of utilizing less space on tag 300 than other shapes for a given minimum dimension.

To enable tracking feature 306 to be tracked more easily than data features 308 when in motion, the tracking feature has a minimum dimension greater than a maximum dimension of each data feature. In the specific example of the depicted circular tracking feature 306, the minimum diameter of tracking feature 306 is greater than a maximum width of each hexagonal tracking feature 308. Likewise, border region 310 also has a minimum width separating tracking feature 306 from a closest feature (either a data feature 308 or orientation feature 304) that is greater than a maximum width of each data feature 308. In FIG. 4, the shape of some data features is shown in dashed lines in border region 310. However, these dashed line data features are included only to more clearly indicate the generally circular shape of data region 302, and not to imply that any data features are contained within border region 310.

The combination of the widths of tracking feature 306 and border region 310 allows tracking feature 306 to be tracked in any direction of movement more easily than any of data features 308 can be tracked. For example, as tag 300 is moved across display screen 206, the larger size of tracking feature 306 compared to each data feature 308 allows tracking feature 306 to overlap itself (or be sufficiently close that it can be assumed it is the same tracking feature) in sequential images at rates of tag movement too great to allow any data feature 308 to overlap itself in sequential images. Further, the width of border region 310 prevents tracking feature 306 from overlapping with any data features 308 in sequential images. In this manner, once tag 300 has been initially read, motion of tag 300 may be positively tracked across display screen 206 by following the path of tracking feature 306 across display screen 206. This may allow display device 100 to track tag 300 with certainty, and therefore to move associated items of data on display screen 206 without lag, under ordinary use conditions.

Tracking feature 306 and border region 310 may have any suitable shapes, sizes and/or dimensions. Suitable shapes and sizes may depend to some degree upon the intended use environment for tag 300. For example, in the use environment described above in the context of FIGS. 1 and 2, examples of suitable sizes for the tracking feature include, but are not limited to, tracking features with minimum dimensions greater than 2× the maximum dimension of the data features. Likewise, examples of suitable sizes for the border regions around the tracking feature include, but are not limited to, borders providing a minimum separation between the tracking feature and nearest data or orientation feature of 1.5× the maximum dimension of the data features.

In one specific embodiment, a one-inch square tag 300 may comprise hexagonal data features 308 with an edge-to-edge width of $\frac{1}{16}$ inch, a circular tracking feature 306 with a diameter of $^{3.5}/_{16}$ inch (i.e. 3.5× the size of data features 308) and a border region 310 having a width of $\frac{5}{16}$ inch to $^{6.5}/_{16}$ inch. If it is assumed that the $\frac{1}{16}$" data feature size is the minimum size that can be imaged when tag 300 is at rest, the extra $^{2.5}/_{16}$ inch diameter of the tracking feature 306 may be used for blur compensation. With an imaging system running at 60 frames/second with 100% integration time (i.e. 16.6 ms), the $^{3.5}/_{16}$ inch tracking feature 306 may be tracked at a speed of up to $(^{2.5}/_{16}$ inch$)/(\frac{1}{60}$ sec$)=9.375$ inches/second. It will be appreciated that the dimensional ranges and specific dimensions described above are provided for the purpose of example, and are not intended to be limiting in any sense.

Additionally, tracking feature 306 may have any suitable location on tag 300, including central locations (i.e. close to the center of the tag) and locations adjacent to one or more edges of the tag. In the depicted embodiment, tracking feature 306 is disposed adjacent an edge of tag 300, and more specifically, a corner of tag 300. In this location, no data features are located between tracking feature 306 and a nearest edge of tag 300. This may allow tracking feature 306 to displace fewer data features 308 than if tracking feature 306 were located centrally on tag 300. Orientation features 304a-c are also depicted as being located adjacent to corners of tag 300. This placement may avoid orientation features 304a-c from displacing data features 308. In alternative embodiments, the tracking feature may be centrally located on a tag. In a central location, the tracking feature may allow the center of the tag to be accurately located while tracking at higher speeds, even where the orientation is lost.

Figure 5:
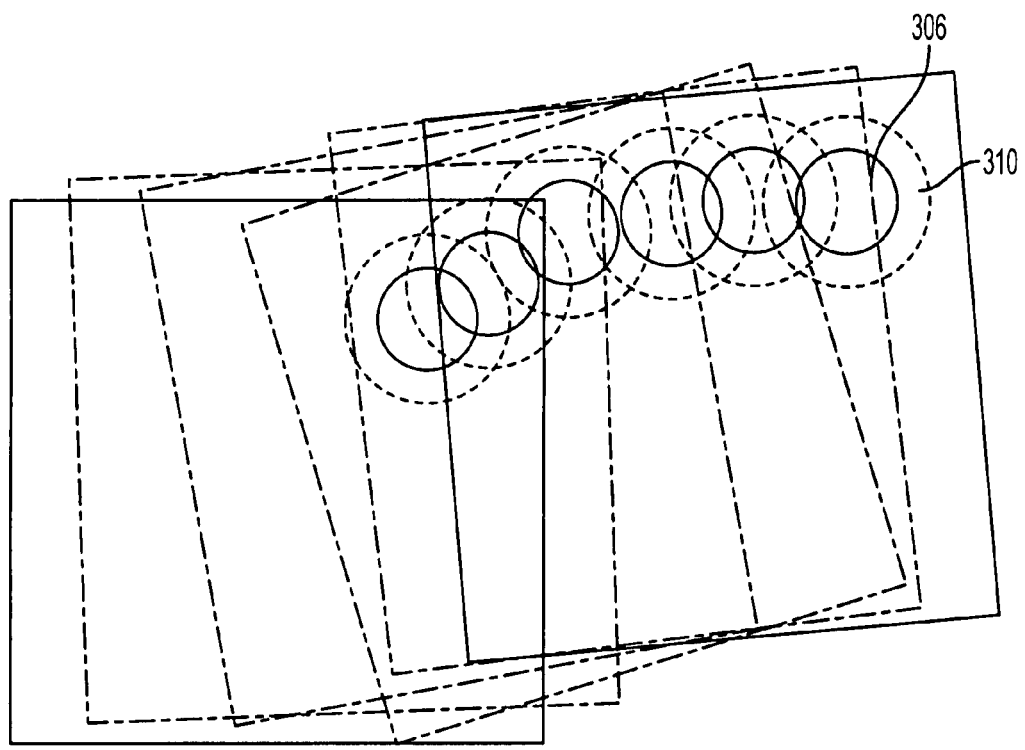
FIG. 5 shows a schematic depiction of a series of images of the tag of FIG. 3 captured as the tag moves across an optically readable surface.

FIG. 5 depicts a sequence of images of tag 300 captured by optical detector 224 as they may appear when tag 300 is moved across display screen 206. Data features 308 and orientation features 304a-c are omitted from FIG. 5 for clarity. In each depicted image of the sequence, tracking feature 306 either partially overlaps with itself in each immediately adjacent image, or partially overlaps with border region 310. Due to the overlapping of the tracking feature 306 and/or border region 310 in immediately adjacent images, tag 300 can be tracked continuously by controller 224 through this motion without re-reading the data features of tag 300.

Figure 6:
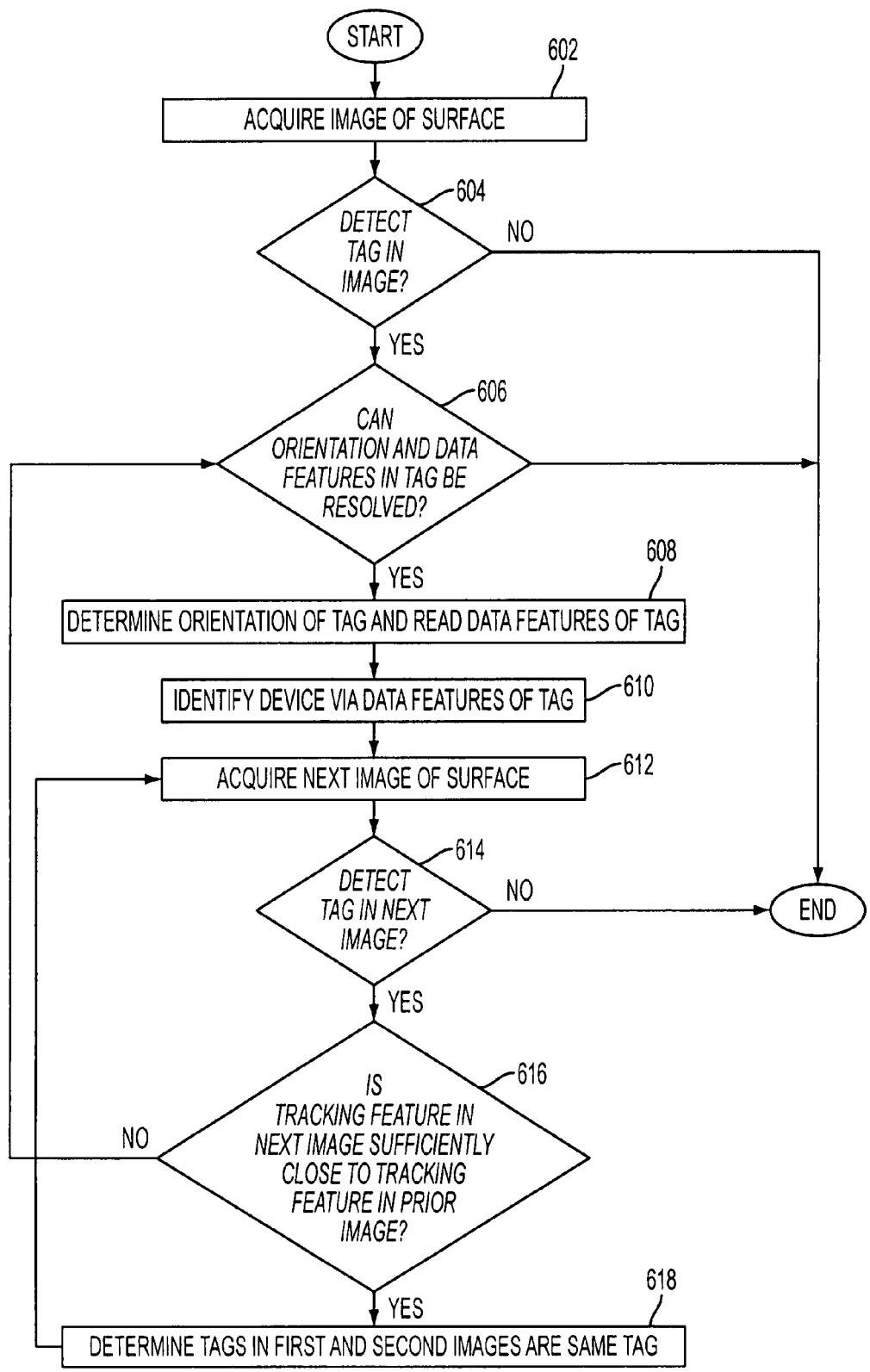
FIG. 6 shows a process flow depicting an embodiment of a method for tracking a motion of a tag across an optically readable surface.

FIG. 6 shows a process flow depicting an embodiment of a method 600 of tracking a motion of a high-resolution tag across an optically readable display surface. Method 600 comprises, at 602, acquiring an image of the display surface, and then, at 604, determining whether an optically readable tag is detected in the image. If no tag is detected, then method 600 ends, and may be restarted when the next frame of image data is acquired. If a tag is detected, method 600 then proceeds to 606, where it is determined if the orientation and data features of the tag can be resolved. If these features cannot be resolved, then method 600 ends for that frame of image data.

On the other hand, if the orientation and data features can be resolved, method 600 next comprises, at 608, determining the orientation of the tag and reading the data features of the tag. After reading the data features of the tag, method 600 comprises, at 610, identifying the tagged device, or the owner of the tagged device, via the value of the tag read. Identifying the tagged device or owner of the device may comprise querying a database containing records that associate individual devices or owners of devices with specific tag values, and/or may comprise saving in local memory an association of the location of the tagged device on the optically readable surface with the value of the tag read at 608.

Continuing with FIG. 6, method 600 next comprises, at 612, acquiring a next image of the optically readable surface, and then, at 614, determining whether a tag is detected in the next image. If a tag is not detected, for example, if the tagged device is removed from the display surface, then method 600 ends. On the other hand, if a tag is detected in the next image, then method 600 comprises, at 616, determining whether the tracking feature in the tag overlaps with the tracking feature and/or the border surrounding the tracking feature in the tag in the immediately prior image. If the tracking features are not sufficiently close in the two images to be assumed to be the same tracking feature, then method 600 does not make a determination that the tags in the two images are the same tag. Method 600 thus returns to process 606 in this instance to determine the identity of the tag in the later-acquired image.

On the other hand, if it is determined at process 616 that the tracking feature in the later-acquired image overlaps at least partially with the tracking feature or the border of the tracking feature in the tag in the immediately prior image, then it is determined at 618 that the tags are the same tag. In this instance, images and other data associated with the tag may be moved on the display surface in such a manner as to track the motion of the tag and therefore to maintain a spatial association of the data with the tagged device. Method 600 then returns to process 612, where another image of the display surface is captured, and loops through the tag tracking processes shown at 614-618 until the tag either disappears from the display surface or until the tag is moved too fast to be tracked.

In some embodiments, tag 300 may not include a tracking feature. In such embodiments, motion of a tagged object may be followed by using those portions of the body of the object itself that appear in the image of the display screen as a low resolution tracking feature. Furthermore, while method 600 is described in the context of the identification and tracking of a single tag, it will be appreciated that a plurality of tags may be identified and tracked on a surface at any one time, and that each of the plurality of tags may be at a different stage of method 600 at any given time.

Furthermore, it will be appreciated that the configurations and/or approaches described herein are exemplary in nature, and that these specific embodiments or examples are not to be considered in a limiting sense, because numerous variations are possible. The specific routines or methods described herein may represent one or more of any number of processing strategies such as event-driven, interrupt-driven, multitasking, multi-threading, and the like. As such, various acts illustrated may be performed in the sequence illustrated, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An optically readable tag, comprising:
   a data region comprising a plurality of data features;
   one or more orientation features;
   a continuous optically readable tracking feature comprising a minimum dimension greater than a maximum dimension of each data feature; and
   a continuous border separating the data features and the one or more orientation features from the tracking feature and having a minimum width equal to or greater than approximately one and a half times the maximum dimension of the data features.

2. The tag of claim 1, wherein the minimum dimension of the tracking feature is equal to or greater than approximately two times the maximum dimension of the data features.

3. The tag of claim 1, wherein the tag has a rectangular shape, and wherein the tracking feature is located adjacent to a corner of the tag.

4. The tag of claim 3, wherein the tag comprises one or more orientation features, and wherein each orientation feature is located adjacent to a different corner of the tag than other orientation features and the tracking feature.

5. The tag of claim 3, wherein one or more data features have a generally hexagonal shape.

6. The tag of claim 1, wherein the tracking feature has a generally round shape.

7. The tag of claim 1, wherein no data features or orientation features are located between the tracking feature and a nearest edge of the tag.

8. The tag of claim 1, wherein the tag has a bit depth of at least 148 bits per square inch.

9. An optically readable tag, comprising:
   one or more orientation features;
   a plurality of data features; and
   a continuous optically readable tracking feature disposed adjacent to an edge of the tag such that no data features are located between the tracking feature and a nearest edge of the tag, the tracking feature comprising a minimum dimension greater than a maximum dimension of the data features and being entirely separated from a closest data feature and a closest orientation feature by a continuous border region having a minimum width greater than approximately one and a half times the maximum dimension of the data features, the border region being free of any data features and free of any orientation features.

10. The tag of claim 9, wherein the minimum dimension of the tracking feature is equal to or greater than approximately two times the maximum dimension of each data feature.

11. The tag of claim 9, wherein the tag comprises three orientation features, and wherein each orientation feature is located adjacent to a corner of the tag.

12. The tag of claim 9, wherein the tracking feature has a generally round shape.

13. The tag of claim 9, wherein one or more data features have a generally hexagonal shape.

14. The tag of claim 9, wherein no data features or orientation features are located between the tracking feature and the nearest edge of the tag.

15. The tag of claim 9, wherein the tag has a bit depth of at least 148 bits per square inch.

* * * * *